United States Patent

Yamada et al.

[11] 4,308,829
[45] Jan. 5, 1982

[54] VANE IN THE INLET PASSAGE OF AN INTERNAL COMBUSTION ENGINE

[75] Inventors: Norimasa Yamada; Yoshihiro Iwashita; Masanori Okada; Yoshihiro Kanome, all of Toyota, Japan

[73] Assignee: Toyota Jidosha Kogyo Kabushiki Kaisha, Toyota, Japan

[21] Appl. No.: 45,016

[22] Filed: Jun. 4, 1979

[30] Foreign Application Priority Data

Sep. 18, 1978 [JP] Japan ................... 53-114221

[51] Int. Cl.³ .............................................. F02D 9/08
[52] U.S. Cl. .............................. 123/188 M; 123/308
[58] Field of Search .............. 123/188 M, 52 M, 141, 123/30 C, 306, 590, 592, 593, 308, 432

[56] References Cited

U.S. PATENT DOCUMENTS

| Re. 25,578 | 5/1964 | Witzky | 123/30 C |
|---|---|---|---|
| 2,920,613 | 1/1960 | Vogel et al. | 123/188 M |
| 3,008,458 | 11/1961 | Eisele et al. | 123/188 M |
| 3,874,357 | 4/1975 | List et al. | 123/188 M |

FOREIGN PATENT DOCUMENTS

| 1576012 | 10/1970 | Fed. Rep. of Germany | 123/188 M |
|---|---|---|---|
| 2803533 | 8/1979 | Fed. Rep. of Germany | 123/188 M |
| 52-64512 | 5/1977 | Japan | 123/188 M |

*Primary Examiner*—Craig R. Feinberg
*Assistant Examiner*—W. R. Wolfe
*Attorney, Agent, or Firm*—Kenyon & Kenyon

[57] ABSTRACT

In an internal combustion engine which is provided with a throttle valve of the type which, when slightly opened, provides a flow of intake gases which is biased towards one particular side of the intake passage, and which is provided with a helical type inlet port which has a helical surface leading to the combustion chamber which imparts swirl to inlet gases, a vane is provided, which particularly directs gases passing near that one particular side of the intake passage towards the start of the helical surface, whereby good swirl and turbulence are generated in the power cylinder, especially during low and medium load operation of the engine.

3 Claims, 2 Drawing Figures

VANE IN THE INLET PASSAGE OF AN INTERNAL COMBUSTION ENGINE

BACKGROUND OF THE INVENTION

The present invention relates generally to intake structures for internal combustion engines, and more particularly, to a vane which is incorporated in the intake passage of internal combustion engines for producing advantageous swirl in the combustion chambers of the engine during operation.

In the field of internal combustion engines, it is known that, if the intake gas induced into a combustion chamber is provided with a swirling motion, the resulting turbulence assists the propagation of flame in the combustion chamber increasing the speed of flame propagation, thereby improving the performance of the engine. In addition, the anti-knock and driving characteristics of the engine, and the quality of the exhaust emissions thereof, are improved.

Conventionally, the inlet port of an internal combustion engine, especially a gasoline engine, is formed so as to minimize the resistance to the flow of intake gases and thereby increase the volumetric efficiency and maximum output power of the engine at high load operation. When such an internal combustion engine is operating at high load, although the flow or suction resistance of the inlet port is low, sufficient turbulence and swirl is caused in the combustion chamber for the flame propagation speed to be kept at an acceptable level.

However, during low and medium load operation, in which the amount of inlet gases is relatively low, a good level of swirl and turbulence of the inlet gases does not occur, due to the low flow resistance of the inlet port, and because the velocity of the inlet gas entering the combustion chamber from the inlet port is low. Thus combustion speed is sometimes not high enough, and, especially if the engine is operating in a lean mixture condition, or is provided with a substantial quantity of exhaust gas recirculation, good operating performance of the engine may be lost.

Conventionally, it has been realized that the generation of swirl in the cylinder is strongly affected by the direction of entry of inlet gases thereinto, and their degree of swirling as they enter. Therefore, in the past, various types of inlet ports have been proposed, with a view to enhancing swirl. One of these has been the so-called helical port, which is provided with a helical surface leading to the valve seating surface and extending helically around the axis of the valve seating surface. This type of port imparts a swirling action to the inlet gases before they pass the inlet valve.

However, there is a significant disadvantage in the performance of such a helical inlet port, which limits the usefulness thereof. If the helical surface is provided as a long and deep helix, so that it imparts a very strong swirling action to the inlet gases, then, at high load operation, when a large volume of inlet gases is required to be passed by the inlet port, the volumetric efficiency of the engine will be degraded, and thus its maximum output power will suffer, due to the increase of the resistance of the inlet passage to the flow of inlet gases. On the other hand, if the helical surface is provided as a short and shallow helix, so that it imparts a rather weak swirling action to the inlet gases, it will not function well at low load operation of the engine. Accordingly, such a helical port has not fully met the need for generating swirl in intake gases.

The present invention results from the realization that, if the flow of inlet gases is specifically directed to the start of the helical surface of a helical inlet port during low and medium load operation of the engine, without greatly increasing flow resistance of the inlet port to inlet gases, swirl and turbulence in the combustion chamber would be advantageously improved, and combustion speed would be increased, without sacrificing engine output power.

It is, therefore, an object of the present invention to provide an apparatus in the inlet passage of an internal combustion engine by which the mixture gas is directed to the start of the helical surface of a helical inlet port, particularly during low and medium load operation of the engine, without greatly increasing flow resistance of the inlet passage.

SUMMARY OF THE INVENTION

According to the present invention, this object is accomplished, in an internal combustion engine of the type having a cylinder; an inlet valve; a cylinder head closing the top of the cylinder, formed with an inlet port which is opened and closed by the action of the inlet valve contacting an inlet valve seating surface of the inlet port, and which is of the helical type having a helical surface leading to the inlet valve seating surface; an inlet passage, defined by a wall, leading to the inlet port; and a throttle valve in the inlet passage, which can move from a first position wherein it substantially closes the inlet passage to a second position wherein it affords a large opening in the inlet passage, and which when it is moved a relatively small amount from the first position affords an opening in the inlet passage which is asymmetrically offset towards a particular portion of the wall of the inlet passage; by a vane, which is provided in the inlet passage downstream of the throttle valve, and which guides gas flowing along the inlet passage nearer the particular wall portion thereof to the helical surface.

BRIEF DESCRIPTION OF THE DRAWINGS

The present invention will become more fully understood from the following description of a preferred embodiment thereof, and from the appended drawings. It should be understood, however, that the description of the embodiment, and the drawings, are intended for the purposes of explanation only, and are not to be taken as limiting the present invention in any way. The scope of protection sought for the present invention, and the definition of its limits, is to be found solely in the appended claims. In the drawings:

DESCRIPTION OF THE PREFERRED EMBODIMENT

Figure 1:
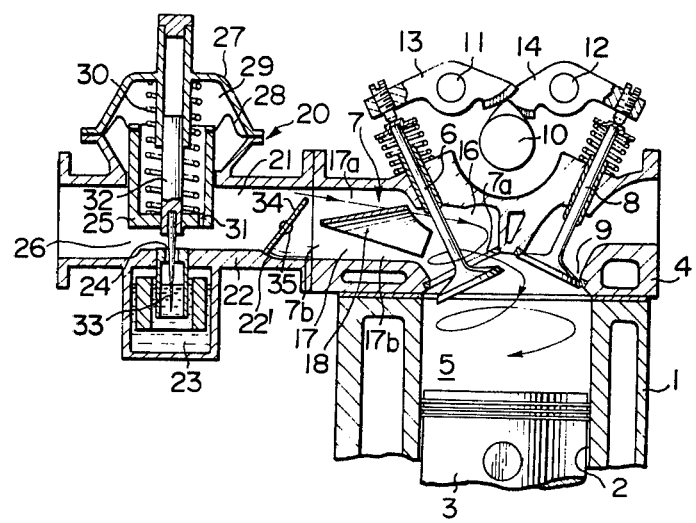
FIG. 1 is a longitudinal section showing an internal combustion engine equipped with a vane which is an embodiment of the present invention.
Figure 2:
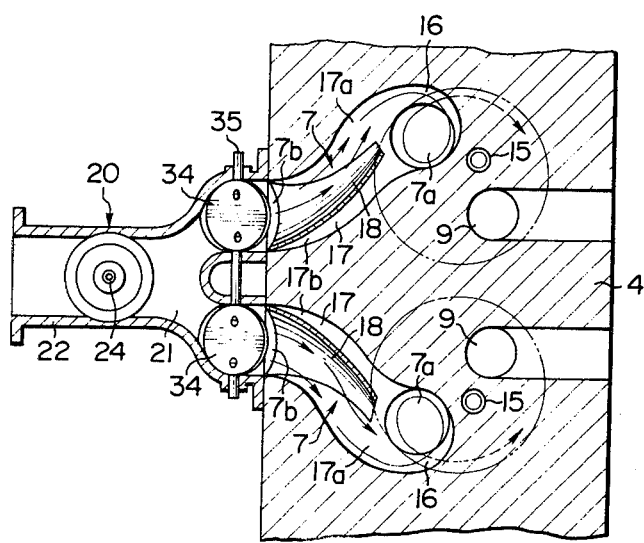
FIG. 2 is a transverse horizontal section of the inlet passage and the vanes of the engine shown in FIG. 1.

Referring to the figures, there is shown an internal combustion engine equipped with vanes according to the present invention, in longitudinal section in FIG. 1. A transverse horizontal section of the inlet passage and the vanes is shown in FIG. 2, which shows two similar cylinders of the engine. In these drawings, reference numeral 1 denotes the cylinder block of the engine, which has a cylinder bore 2 therein in which reciprocates a piston 3. A cylinder head 4 closes the top of the cylinder bore 2, defining a combustion chamber 5 above the piston 3. This cylinder head 4 has an inlet port 7, which is an opening in the surface of the combustion chamber 5 which is opened and closed by means of an inlet valve 6 which contacts a seating surface at the end of the inlet port 7 which is not denoted by any reference number, and further has an exhaust port 9, which is another opening in the surface of the combustion chamber 5 which is opened and closed by means of an exhaust valve 8. These inlet and exhaust valves 7 and 8 are opened and closed by means of an overhead cam valve driving apparatus, which is known in the art, and which includes a camshaft 10, rocker arm shafts 11 and 12, rocker arms 13 and 14, etc. The cylinder head 4 is equipped with an ignition plug 15.

In this engine, the inlet port 7 is constructed as a helical type inlet port, in which the opening 7a to the combustion chamber is offset from the central axis (not shown) of the cylinder, and a helical surface 16 is provided which leads to the inlet valve seating surface, helically around the axis of this inlet valve seating surface. This helical surface 16 communicates, via an cylinder head inlet passage 17, with a cylinder head inlet opening 7b in the side of the cylinder head 4. In this cylinder head inlet passage 17 is provided a vane 18 according to the present invention.

This vane 18 extends substantially from the cylinder head inlet opening 7b to the start of the helical surface 16, and, in this embodiment, it reaches across the inlet passage 17 so as to divide it into two passages 17a and 17b, which extend beside one another, separated by the vane 18. The left-hand end of this vane 18 extends substantially horizontally across the cylinder head inlet opening 7b, so as to divide it approximately in half, with an upper and a lower part. Along its length, this vane 18 gradually twists, so that at its right-hand end in the figure, which is nearest the inlet port 7, the end of passage 17a, which is the passage which opens to the upper part of the cylinder head inlet opening 7b at its left-hand end, is substantially at the start of the helical surface 16. Further, the shape of the vane 18 is such that the cross-sectional area of the passage 17a narrows down in the direction away from the cylinder head inlet opening 7b towards the inlet port 7.

It is preferable that the vane 18 should have a length of about 1.5–2.5 times the diameter of the passage 17. It should be noticed that, in this embodiment, the leading edge of the vane 18, which crosses the cylinder head inlet opening 7b, is cut away, i.e. concaved. This provides a good slicing action of the impinging gas flow, and thus reduces turbulence in the inlet passage.

To the cylinder head inlet opening 7b, fuel/air mixture produced by a carburetor 20 is delivered. In this embodiment, the carburetor 20 is a variable venturi type carburetor known as a SU-type carburetor. However, this is not essential.

The carburetor 20 has a body 22, which includes an inlet passage 21 extending transversely through it. The body 22 is coupled with the side of the cylinder head 4, so that one end of the inlet passage 21 is connected to the cylinder head inlet opening 7b. In the shown embodiment, the carburetor 20 is adapted to deliver fuel/air mixture to two cylinders of the engine, and therefore the inlet passage 21 is formed into two branches at its end which is nearer to the cylinder head 4, each of these branches being connected to a cylinder head inlet opening 7b associated with one of these two cylinders.

The body 22 has a float chamber 23 in which a supply of fuel is maintained at a constant level by means well known in the carburetor art. This fuel is sucked into the inlet passage 21 through a metering orifice 24 in the bottom wall of the inlet passage 21. The body 22 further carries a suction piston 25 in a position opposed to the metering orifice 24, this suction piston 25 being movable upwards and downwards as seen in the drawing. The bottom end of this suction piston 25 defines a variable venturi opening 26, in co-operation with the bottom wall and the side walls of the inlet passage 21. The suction piston 25 further defines a negative pressure chamber 29 in co-operation with a cover 27 and a diaphragm 28, and is movable upwards in the drawing by the vacuum depression in the chamber 29, against the action of a compression coil spring 30. This negative pressure chamber 29 communicates to the variable venturi opening 26, via a suction hole 31, and therefore is provided with venturi vacuum. Furthermore, this suction piston 25 carries a metering needle 33 by way of a guide rod 32. This metering needle 33 engages into the metering orifice 24, and therefore varies the effective opening area thereof, thus metering the flow of fuel therethrough.

In this arrangement, as is well known, as the negative pressure or depression at the variable venturi opening 26 increases, the suction piston 25 is moved upwards in the drawing against the biasing action of the compression coil spring 30, and widens the effective opening of the variable venturi opening 26, thereby decreasing the said negative pressure there. Conversely, as the negative pressure at the venturi opening 26 decreases, the suction piston 25 is moved downwards in the figure by the biasing action of the compression coil spring 30, and its own weight, thereby increasing the said negative pressure at the variable venturi opening 26, by decreasing the effective opening thereof. Thus, the negative pressure at the variable venturi opening 26 is maintained at an approximately constant value during engine operation and the effective cross-sectional area of this variable venturi opening 26 is made to be proportional to the inlet air quantity at each particular time. In connection with this, the profile of the metering needle 33 is so designed that, in response to the opening and closing of the venturi opening 26, it opens and closes the metering orifice 24 to the correct degree so that the air/fuel ratio of the inlet gases which are provided to the engine are maintained approximately constant, irrespective of the actual quantity of inlet gases.

The actual quantity of inlet gases inhaled by the engine is controlled by a butterfly type inlet throttling valve 34, which is located in the inlet passage 21 downstream from the venturi opening 26. A shown in FIG. 2, one such throttle valve is provided for each cylinder of the engine, and these valves are controlled by a common valve shaft 35, which is operated by the accelerator pedal of the vehicle. It is essential to the operation of the vanes 18 according to the present invention that these throttle valves 34 are of the type which, when slightly opened, provide a gas flow which is biased towards one side of the inlet passage, which is the upper side in FIG. 1. This is because each throttle valve 34 is adapted to open the inlet passage 21 only at the upper part thereof, until the said throttle valve 34 reaches a certain pre-determined opening, by the lower circumference of the butterfly valve 34 corresponding to a spherical wall portion 22' formed on the lower wall of the inlet passage 21. This asymmetrical flow provided by the throttle valve 34 may continue until the throttle valve 34 is opened, for example, 30°–40° from its full-closed position. That is, in this embodiment, the opening in the inlet passage, when the throttle valve 34 is moved a relatively small amount from the idling position, is asymmetrically offset towards the upper side of the inlet passage, as seen in FIG. 1. According to the principle of the present invention, this upper side of the inlet passage is the part which opposes the passage 17a formed on the one side of the vane 18 which leads to the start of the helical surface 16.

The intake system described above operates as follows:

In low and medium load operation of the engine, when the opening of the throttle valve 34 is relatively small, the gas which flows past throttle valve 34 towards the cylinder head inlet opening 7b is conducted through a relatively small gap between the upper edge of the throttle valve 34 and the upper wall of the inlet passage 21. Thus, this gas flow is rather close to this upper wall, and therefore all or almost all of it is directed into the passage 17a, rather than into the passage 17b. As this gas flows through the passage 17a, it is not dispersed and its speed is kept high because of the narrowness of this passage, and further because the passage 17a narrows down towards the inlet port 7 the speed of this gas is actually increased towards the inlet port 7. When this gas emerges from the right hand end in the figure of the passage 17a, it impinges directly on the start of the helical surface 16, and is imparted with strong swirling action thereby. This, when the gas enters the combustion chamber 5, a strong swirl flow is set up in the combustion chamber 5 around its central axis, as shown in FIG. 2. This promotes good engine operation.

In high load operation of the engine, on the other hand, the throttle valve 34 is wide open, and the flow of intake gases is not substantially biased towards any particular part of the intake passage 21 thereby. Therefore, these gases flow to the inlet port 7 through both the passages 17a and 17b, and the provision of the vane 18 does not provide any substantial obstacle to free breathing of the engine. However, the above-described swirling effect which occurs markedly during low and medium load operation of the engine also takes place, although to a less noticeable extent, during high load operation of the engine, and this again promotes good engine operation.

From the foregoing descriptions it will be clearly seen that the vane of the present invention functions to generate a swirl in the combustion chamber, and particularly to generate good swirl during low and medium throttle opening operation of the engine. Thus, good combustion speed can be obtained over the entire range of operational conditions of the engine, and engine output power, anti-knock characteristic, and quality of engine exhaust emissions can be improved.

It should be understood that, although the shown embodiment of the invention contains a vane which completely divides the inlet passage into two separate inlet passages, this is not essential for the present invention; it would suffice for the vane merely selectively to direct some of the incoming fuel/air mixture, at small throttle openings, to the helical surface. In embodiments wherein the vane of the present invention divides the inlet passage into two separate inlet passages, it is not essential for the passage which preferentially receives fuel/air mixture at small throttle openings to narrow down in the direction towards the inlet port, although it is beneficial. Therefore, is should be understood that, since various changes, modifications, and omissions can be made in the details of any particular embodiment of the present invention, without departing from its scope, the present invention is not to be limited by any particular details of the embodiment which has been shown, or of the drawings, but solely by the appended claims.

We claim:

1. In an internal combustion engine of the type having a cylinder having a central axis; an inlet valve; a cylinder head closing the top of the cylinder, the cylinder head being formed with an inlet port which is opened and closed by the action of the inlet valve contacting an inlet valve seating surface of the inlet port, and which is of the helical type having a helical surface leading to the inlet valve seating surface; an inlet passage, defined by a wall leading to the inlet port; and a throttle valve in the inlet passage, the throttle valve being movable between a first position wherein it substantially closes the inlet passage, to a second position wherein it affords a large opening in the inlet passage, and which when it is moved a relatively small amount from the first position affords a small first opening in the inlet passage which is asymmetrically offset towards a particular portion of the wall of the inlet passage; the internal combustion engine being CHARACTERIZED IN THAT there is further provided: a vane in the inlet passage downstream of the throttle valve, said vane having a concaved leading edge located in proximity to the throttle valve, said leading edge spanning across the inlet passage so as to define a first flow passage having a first flow passage inlet which is aligned with the small first opening defined between the throttle valve and the particular wall portion of the inlet passage, and a second flow passage which is further from the particular wall portion of the inlet passage, said vane having a trailing edge which defines the end of the first flow passage to be disposed substantially at the start of the helical surface.

2. The internal combustion engine as in claim 1, wherein said first flow passage narrows down in cross-sectional area in a direction leading away from the throttle valve.

3. The internal combustion engine as in claim 1, wherein said vane is twisted from said leading edge towards said trailing edge so as to adapt said leading edge to be in alignment with the small first opening in the inlet passage, and to adapt said trailing edge to be near said start of the helical surface.

* * * * *